United States Patent [19]
Morgan et al.

[11] Patent Number: 5,778,875
[45] Date of Patent: Jul. 14, 1998

[54] FIRST STAGE REGULATOR AND ROTATABLE IN-LINE VALVE

[75] Inventors: Michael V. Morgan, Laguna Beach; Carl Winefordner, Costa Mesa, both of Calif.

[73] Assignee: U.S. Divers Co., Inc., Santa Ana, Calif.

[21] Appl. No.: 643,325

[22] Filed: May 6, 1996

[51] Int. Cl.[6] .................................................. A61M 16/00
[52] U.S. Cl. ............................ 128/204.26; 128/205.24
[58] Field of Search .......................... 128/201.28, 204.26, 128/205.24; 137/68.19, 68.23

[56] References Cited

U.S. PATENT DOCUMENTS

| | | | |
|---|---|---|---|
| 1,348,708 | 8/1920 | Garland | 137/68.23 |
| 2,383,961 | 9/1945 | Freygang | 137/68.23 |
| 2,524,052 | 10/1950 | Grant, Jr. | 137/68.23 |
| 4,724,833 | 2/1988 | Bartos | 128/205.24 |
| 4,928,686 | 5/1990 | Nelepka | 128/205.24 |
| 5,099,835 | 3/1992 | Nelepka | 128/204.18 |
| 5,184,609 | 2/1993 | Hart | 128/205.24 |
| 5,209,224 | 5/1993 | Nelpka | 128/204.18 |
| 5,343,858 | 9/1994 | Winefordner et al. | 128/204.26 |
| 5,368,022 | 11/1994 | Wagner | 128/205.24 |
| 5,413,096 | 5/1995 | Hart | 128/205.24 |

*Primary Examiner*—Aaron J. Lewis
*Attorney, Agent, or Firm*—George F. Bethel; Patience K. Bethel

[57] ABSTRACT

A regulator for a self-contained breathing apparatus having a regulator body connected to a source of high pressure gas. An in-line valve within the regulator body is in communication with the source of high pressure gas. A primary burst disc is disposed within the in-line valve which is adapted to block the passage of gas from the source of pressurized gas when the gas is pressurized below a given pressure and to give way when the gas is pressurized above a given pressure when the in-line valve is closed. A first stage regulator is disposed within the regulator body for receipt of pressurized gas when the in-line valve is open. A demand regulator can be connected to the regulator body for receipt of regulated breathing gas from the first stage regulator. A conduit within the regulator body extends from the high pressure chamber to ambient and a burst disc is disposed within the conduit which will burst above a given gas pressure.

20 Claims, 3 Drawing Sheets

FIRST STAGE REGULATOR AND ROTATABLE IN-LINE VALVE

FIELD OF THE INVENTION

This invention relates to a compact, portable, lightweight breathing device for emergency use underwater as in emergency egress from aircraft particularly helicopters and for an emergency air source for industrial or firemen's safety in hazardous or contaminated air conditions or in the alternative, for a self-contained underwater breathing apparatus.

BACKGROUND OF THE INVENTION

There is currently a need for a lightweight, portable, emergency air supply particularly for aircraft crews who are subject to emergency egress from aircraft, particularly when such egress places such crews into water.

Breathing gas is highly pressurized and needs to be regulated from about 3,000 psi down to about 120 to 140 psi. Such regulators are known in self-contained breathing apparatus. Typically, pressure is reduced through two stages, with the second stage commonly referred to as a demand regulator. Inhalation from a demand regulator causes movement of a diaphragm which operates a valve linked to it. Upon the demand regulator valve opening, the first stage or high pressure regulator then regulates gas flow from the source, such as a high pressure tank or cylinder. For emergency use, such regulation of high pressure gas is also required.

In addition, it is desirable to quickly release the pressurized breathing gas under conditions which could cause overpressurization. In the past this has been solved by including a side passage separate from the gas flow passage which communicates with a high pressure zone having a plug inserted therein. The plug inserted in the side passage has an axial passage which is blocked by a burst disc. This additional side passage requires additional manufacturing operations and expense.

SUMMARY OF THE INVENTION

This invention provides a unique in-line valve and a first stage regulator which combines a primary safety burst disc near the pressurized source of breathing gas or air and a secondary burst disc which is in communication with the high pressure regulator. Both of the burst discs can be adjusted to burst at any desired pressure but preferably are adjusted to burst at ⅔rds of the operating pressure.

In the event that the valve is closed during excess pressurization, both discs will rupture. If the valve is open during pressurization then only the secondary burst disc will rupture.

The pressurized breathing gas cylinders can be sized to provide, for example, 2.5 ft³ and be 2.25"×9" long which would provide about 50 breaths. For longer emergency periods, the gas cylinders can be sized at 13 ft³ and 19 ft³. Such cylinders for emergency would be smaller than a standard breathing gas cylinder which would be 80 ft³.

The breathing gas cylinder with the combined in-line rotatable valve and first stage regulator and independently mounted 2nd stage demand regulator would be packed or carried in a holster.

The in-line rotatable valve can be directly attached to a cylinder of compressed air or breathing gas. The in-line rotatable valve admits high pressure gas to a first stage regulator valve.

A valve body which is adapted for insertion within the neck of a cylinder of pressurized breathing gas is formed with a central or axial through passage. The through passage is relatively narrow nearest the gas cylinder and includes an intermediate enlarged high pressure chamber. A crown or orifice is formed within the narrow portion of the through passage for valving high pressure gas into the enlarged high pressure chamber.

An in-line rotatable valve is inserted within the valve body. The rotatable valve has an elongated portion with a central bore or passage having a movable seating end which is seated or unseated with respect to the orifice leading to the pressurized gas cylinder by twisting to raise or lower the movable valve seat. A first burst disc is inserted within the central bore or passage adjacent the seating end.

If the pressurized gas cylinder exceeds a predetermined pressure when the rotatable valve is closed, the burst disc will break and the gas will be released through the central bore.

Above the burst disc are a plurality of radial passages extending from the exterior of the elongated portion of the moveable valve to the central bore. Under normal operation, when the rotatable valve is open, gas passes from the exterior of the moveable valve through the radial passages into the central bore and into the enlarged high pressure chamber.

The enlarged high pressure chamber also includes a crown or orifice which cooperates with a first stage regulator within the high pressure chamber for valving high pressure gas from the enlarged high pressure chamber to a lower pressure zone to a second stage demand regulator.

The first stage regulator includes a spring block and springs for biasing a movable valve member within the enlarged chamber for sealing or seating contact with the orifice leading to the low pressure zone. Another spring separates the moveable valve member from the spring block for biassing against the spring block and the rotatable valve member.

A passage within the valve body provides communication between the enlarged high pressure chamber and an exit port. The exit port is stopped or blocked with a plug which has at least one passage or opening which opens to ambient. A burst disc is inserted within the valve body passage. Pressurization higher than a given value will cause the burst disc to fail and the gas to escape to ambient through the passages within the plug.

Another passage within the valve body between the high pressure chamber and a port can be used for insertion of a pressure gauge.

The low pressure zone is formed within a portion of the through passage or bore within the valve body. At least one port or opening extends from the exterior of the valve body for connection to a second stage demand regulator.

The low pressure zone opens into a cavity in which there is disposed a diaphragm exposed to ambient pressure. A main spring is disposed within the cavity containing the diaphragm for balancing against a spring pad and a spring support and spring adjustment screw for biassing the diaphragm toward the high pressure chamber.

Linkage means are disposed between the diaphragm and the movable valve member for moving the movable valve member against the bias of the spring in the high pressure chamber in response to movement of the diaphragm.

DETAILED DESCRIPTION OF THE DRAWINGS

Figure 1:
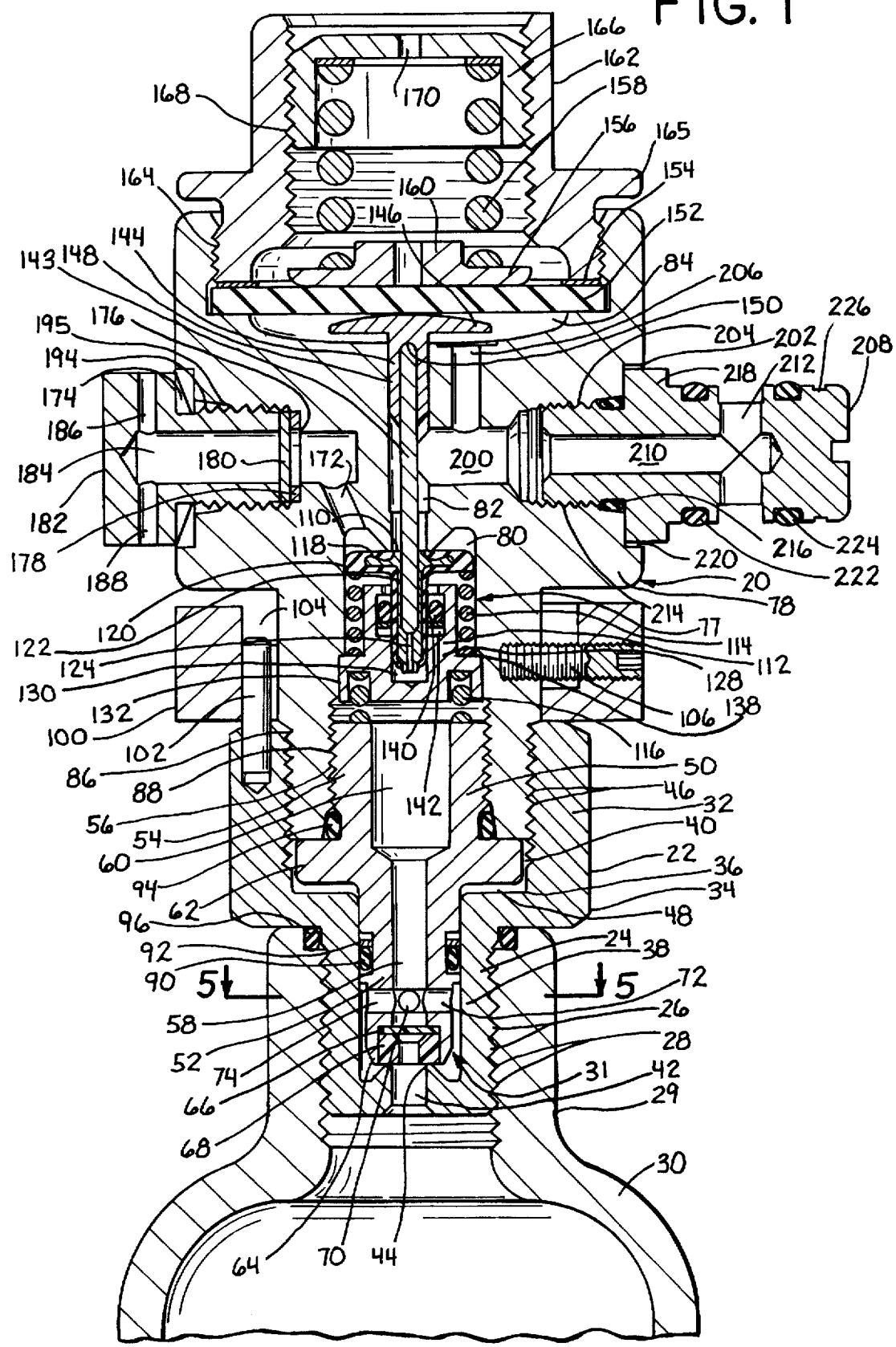
FIG. 1 shows a midline sectional view of the in-line rotatable valve and first stage regulator of the invention.

Looking more specifically at the figures in the entirety and in particular FIG. 1, there can be seen the in-line valve and first stage regulator combination or assembly 20 of the invention. The regulator assembly 20 includes an adapter 22 which has a smaller diameter portion 24 having external threads 26 which are threadedly inserted within internal threads 28 within an upper extension or neck 29 of a pressurized air or breathing gas cylinder 30.

The in-line valve 31 includes the adapter or rotatable valve body 22 which has a large diameter portion 32 formed into an external shoulder or flange 34. The smaller diameter portion 24 and the larger diameter portion 32 define a central bore or opening 36 having a corresponding small diameter bore 38 which opens into a large diameter opening or chamber 40.

The small diameter bore 38 opens into an even smaller diameter bore 42 nearest the gas cylinder 30 and is formed into a crown or orifice 44 for valving high pressure breathing gas or air into the small diameter bore 38 and then to the larger diameter opening or chamber 40. The larger diameter portion 32 has internal threads 46. A shoulder or ledge 48 is formed interiorly at the base of the larger diameter portion 32.

A rotatable valve member 50 is inserted within the adapter 22 and communicates with the pressurized air cylinder 30. The rotatable valve member 50 has a relatively small diameter elongated portion 52. A relatively large diameter portion 54 has exterior threads 56.

The elongated portion 52 has a central bore or axial passage 58 which opens into a larger diameter bore 60 within the relatively large diameter portion 54. An exterior peripheral flange or shoulder 62 is formed generally between the smaller diameter elongated portion 52 and the large diameter portion 54.

The elongated portion 52 having the small diameter bore 58 has a seating end 64 in which a primary burst disc 66 and a valve seat 68 are inserted. The valve seat 68 is seated or unseated with respect to the orifice 44 within the adapter or rotatable valve body 22.

Spaced from the primary burst disc 66 are four radial passages or openings 70, 72, 74, and 76 disposed around the periphery of the valve member 50. The four radial openings 70, 72, 74, and 76 communicate with the central bore 58 within the valve member 50 for transmission of pressurized air or breathing gas from the cylinder 30 to a first stage regulator 77.

A first stage regulator body or main body 78 has a relatively large diameter axial opening or chamber 80 which communicates with a relatively small diameter axial opening or bore 82. A cavity or recess 84 overlies and communicates with the small diameter axial opening or bore 82.

The first stage regulator body 78 has exterior threads 86 and interior threads 88 for connection to the adapter or rotatable valve body 22 and for connection to the rotatable valve member 50. The exterior threads 86 engage the interior threads 46 of the adapter 22 while the interior threads 88 engage exterior threads 56 on the large diameter portion 54 of the rotatable valve member 50.

The rotatable valve member 50 fits into the smaller diameter portion 24 of the adapter 22. An O-ring 90 and a backup ring 92 are disposed around the valve member 50 to effect a tight seal within small diameter bore 38 of the adapter 22. The flange 62 of the rotatable valve member 50 contacts the shoulder 34 within the adapter 22. Another O-ring 94 rests on the flange 62 and surrounds the large diameter portion 54 to seal the rotatable valve member 50 within the large diameter opening or high pressure chamber 80.

Surrounding the adapter 22 is another O-ring 96 to seal the adapter 22 within the neck 29 of the cylinder 30 of compressed breathing gas or air.

An indicator ring or collar 100 fits around the first stage regulator or main body portion 78. A dowel pin 102 is visible within an opening 104 in the ring or collar 100 to indicate the open or closed condition of the valve member 50.

Rotation of the collar 100 and main body portion 78 opens and closes the rotatable valve by seating and unseating the moveable valve member or seat 50 with respect to the crown or orifice 44. A set screw 106 within the collar 100 prevents rotation of the collar beyond the open or closed condition.

The first stage regulator 77 is disposed within the large diameter or high pressure chamber 80 formed within the main body or regulator body 78. The high pressure chamber 80 includes a crown or orifice 110 downstream of the rotatable valve.

The first stage regulator 77 includes a spring block 112 and springs 114 and 116 for biasing a moveable valve member 118 against the crown or orifice 110 to valve high pressure gas from the high pressure chamber 80 to the small diameter bore or low pressure chamber 82 within the main body 78.

Figure 6:
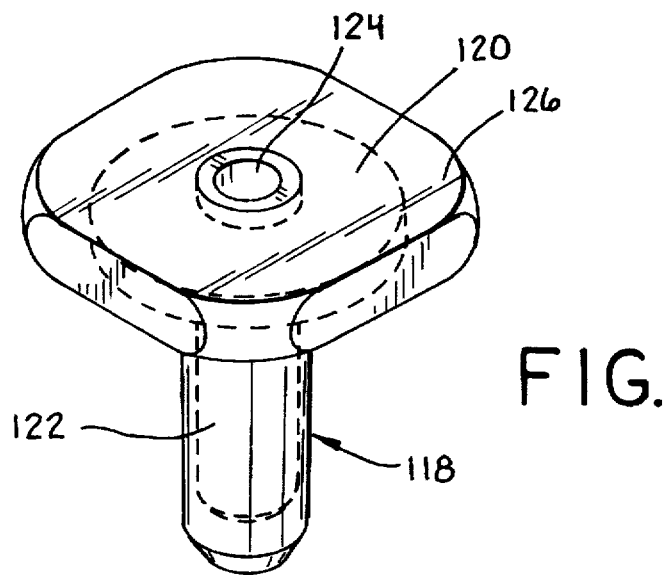
FIG. 6 shows an enlarged view of a moveable valve member.

As seen in FIG. 6, the moveable valve member 118 includes an enlarged flattened circular head 120 attached to a stem or upright member 122. The head 120 and the stem 122 are preferably made of brass or other metal. A central bore 124 passes through the enlarged head 120 and through the stem 122.

Surrounding the flattened circular head 120 and stem 122 is molded a plastic such as a thermoplastic resin in the form of polyether block amides. It is preferably comprised of regular and linear chains of rigid polyamide sold in part under the trademark nylon and flexible polyether blocks. The molded plastic forms a peripheral side extension 126 of the flattened circular head 120 to form a generally square member with flattened sides and rounded corners.

Other plastic materials or resins can be used which provide the desirable properties of sufficient hardness for durability yet soft enough to provide a good seal and to adhere to the metal material of the underlying head 120 and stem 122.

The molded plastic surface covering the top surface or head 120 of the moveable valve member 118 seats or seals against the orifice or crown 110 opening into the high pressure chamber from the lower pressure small bore 82 in the main body 78.

Within the high pressure chamber 80, the spring block 112 overlies the rotatable valve member 50. The spring block 112 is formed with a cylindrical member 128 having a cavity or opening 130. A shoulder 132 surrounding the cylindrical member 128 receives one end of the spring 114 while the other end of the spring 114 engages the moveable valve member 118. A portion of the cylindrical member 128 extending below the shoulder 132 of the spring block 112 is surrounded and contacted by one end of the spring 116 while the other end of the spring 116 is in contact with the rotatable valve member 50.

The spring block 112 is checked from movement by the shoulder 132 of the spring block engaging a step or ledge 138 on the walls of the high pressure chamber 80.

The stem member 122 of the moveable valve member 118 is received within the cavity or opening 130 within the spring block 112 and sealed by an O-ring 140 and a backup ring 142. In this manner, it seals the area around the stem 122 so that flow of high pressure gas from the high pressure chamber 80 cannot flow into the low pressure side formed by small diameter bore 82 in the main body 78. At the same time, the moveable valve member 118 can move upwardly and downwardly against the springs 114 and 116 in the high pressure chamber 80 so that pressure can be regulated.

Since the stem 122 covered with the plastic mold must pass through the O-ring 140 during operation, over time it can bind and adhere to the O-ring causing binding and adherence to the O-ring. To avoid binding and the possible extrusion of the O-ring 140 into the bottom of cavity or opening 130 in the spring block, a Teflon™ back-up ring is utilized. To provide for movement of the stem 122 against the O-ring 140, a light lubricant can be utilized.

One end of a pin 143 is received within the central opening 124 of the movable valve member 118. The other end of the pin 143 is received within a pin support 144. The pin support 144 has an enlarged curved surface 146 and a stem 148 having an opening 150 therein to receive the pin. The pin support 144 can be made of brass or other suitable material.

The enlarged surface 146 of the pin support 144 is disposed within the cavity 84 in the main body 78 while the stem 148 extends into the small diameter bore 82 of the main body 78.

A diaphragm 152 exposed to ambient pressure overlies the large surface 146 of the pin support 144 within the cavity 84. A gasket 154 overlies the diaphragm 152. The diaphragm 152 can be made of an elastomeric rubber formed with two layers of rubber over fabric. However, the diaphragm 152 can be made of any other suitable material so long as it provides diaphragmatic flexibility in association with the other portions of the regulator.

Overlying the diaphragm 152 is a spring pad or spring support 156 which receives a diaphragm spring 158 by seating it around an upstanding portion 160.

Figure 2:
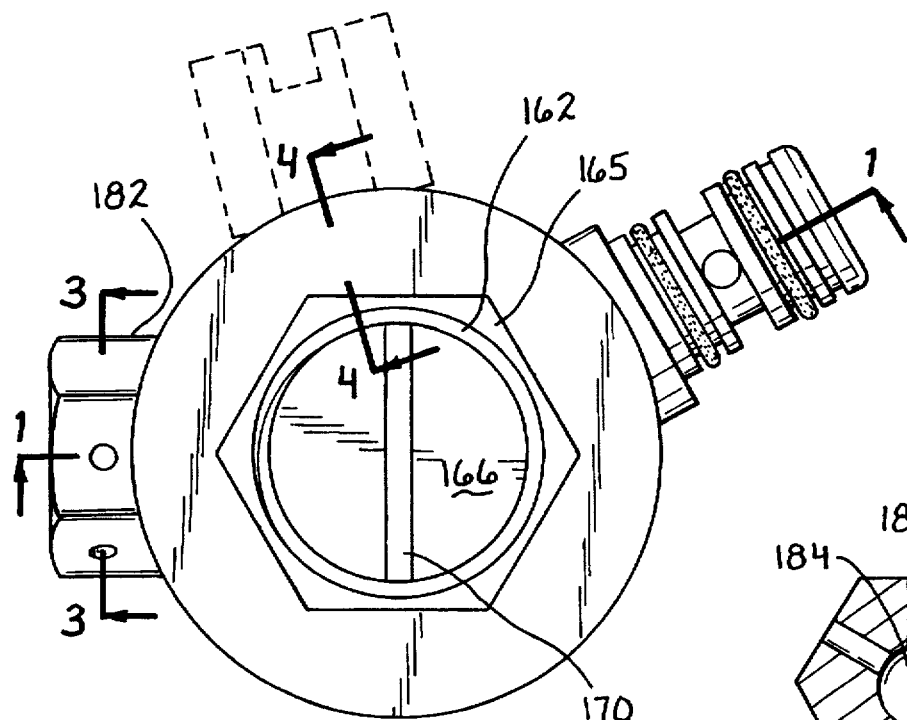
FIG. 2 shows a plan view of the in-line rotatable valve of FIG. 1.
Figure 3:
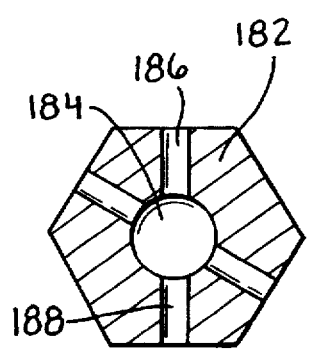
FIG. 3 shows a cross section taken along the lines 3—3 of FIG. 2.

In order to retain the diaphragm spring 158 in seated relationship with the main body 78, a diaphragm spring retainer or cap 162 is utilized. The diaphragm spring retainer or cap 162 is threaded into the main body 78 at threads 164 which interface the main body 78 and the diaphragm spring retainer 162. As seen in FIGS. 1 and 2, a hexagonal flange 165 on cap 162 can be turned with a hexagonal wrench during assembly.

Adjustment is provided to the diaphragm spring 158 by means of an adjusting screw 166. The adjusting screw 166 is seated within the diaphragm spring retainer or cap 162 by means of being threaded into threads 168 therein. An exposed notch 170 can receive a screwdriver or other adjustment tool to allow it to turn within the threads 168 and provide for increased or decreased pressure on the diaphragm spring 158.

A passage 172 is formed within the main body 78 which communicates between the high pressure chamber 80 and a port or opening 174 to ambient pressure. The passage 172 includes a shoulder 176 for receipt of a washer 178 and a burst disc 180. The port 174 is stopped or blocked with a plug 182 which has a main central passage 184 and 4 opposed radial passages 186, 188, 190, and 192 at right angles to the main passage 184. The plug 182 has exterior threads 194 which engage interior threads 195 in the port 174.

In the event that pressurization higher than a given value takes place within the high pressure chamber 80, the burst disc 180 will fail or give way. The pressurized gas from the high pressure chamber 80 will then escape to ambient through the passage 172 and through the main passage 184 of the plug 182 and radial passages 186, 188, 190, and 192 of the plug. The opposed radial passages 186, 188, 190, and 192 serve to diffuse the pressure in opposite directions with equal force.

Figure 4:
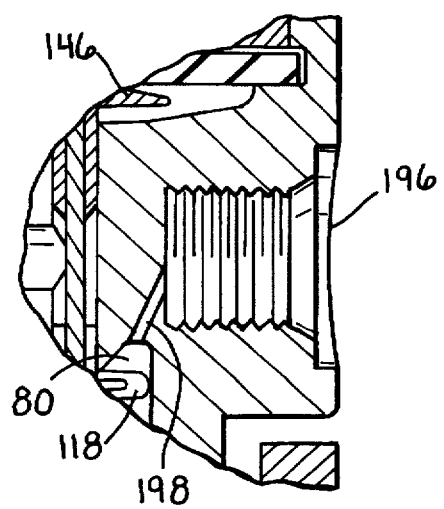
FIG. 4 shows a sectional detail of the high pressure port for a pressure gauge taken along the lines 4—4 of FIG. 2.
Figure 5:
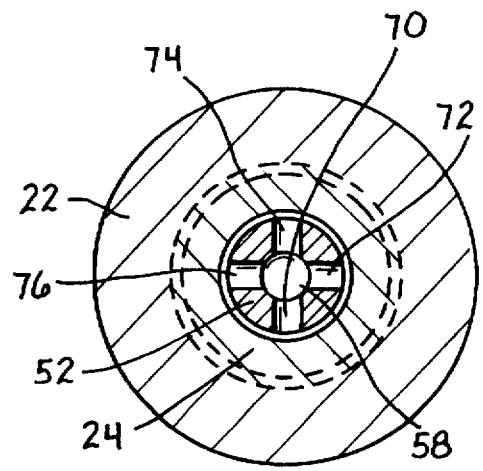
FIG. 5 shows a sectional view of the rotatable valve taken along the lines 5—5 of FIG. 1.

As shown in FIG. 4, a similar port 196 having a smaller diameter passage 198 to the high pressure chamber 80 is provided for attachment of a high pressure gauge, not shown, to determine the pressure remaining in a tank 30 of pressurized breathing gas. Alternately, the port 196 can be plugged or eliminated.

The small bore passage 82 within the main body 78 forms a low pressure zone or section between the diaphragm 152 and the orifice or crown 110 opening into the high pressure chamber 80.

Figure 7:
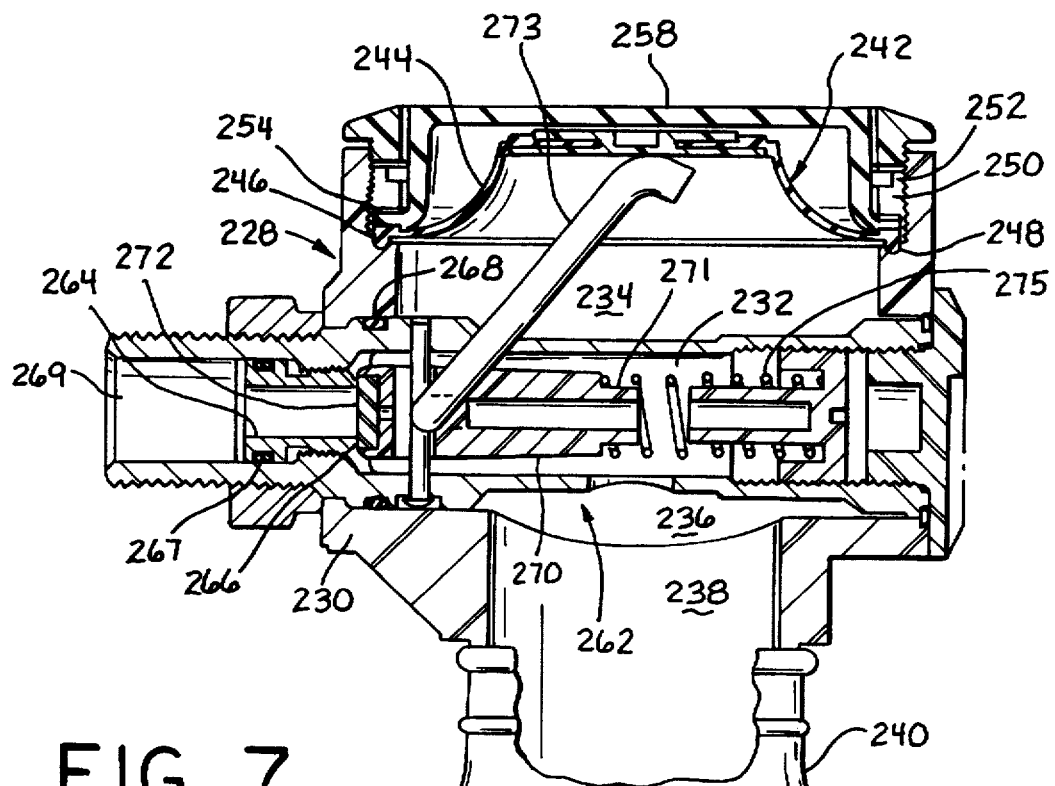
FIG. 7 shows a second stage or demand regulator for use with the regulator of the invention.

A passage 200 from the low pressure zone extends outwardly and opens into a port 202 having interior threads 204 for connection to a second stage demand regulator shown in FIG. 7. A smaller side passage 206 from the passage 200 opens into the cavity 84 and provides a venturi effect to assist breathing through a demand regulator once breathing has commenced.

As shown, the port 202 contains a swivel fitting 208. The swivel fitting 208 has a central passage or bore 210 which opens into an intersecting passage 212 to ambient. An exteriorly threaded end 214 with an O-ring 216 interlocks with interior threads 204 within the port 202.

A flange or shoulder 218 of the fitting 208 seats or rests against a recess 220 formed within the exterior port opening 202. A pair of O-rings 222 and 224 on either side of the intersecting breathing gas passage 212 provides a seal for a slip fit connector to a second stage demand regulator such as that shown in FIG. 7. The connector is retained on the fitting 208 by means of a C-clip, not shown, which is received into a groove 226 at the end of the swivel fitting 208.

A second stage or demand regulator can be cooperatively used with the regulator 20 of the invention. One such regulator is shown in FIG. 7, although other types can be used without departing from the invention.

As shown, a housing for a second stage or demand regulator 228 incorporates a round cylindrical chamber 232 which receives the valve functions detailed hereinafter.

Connected to the cylindrical chamber 232 and an upper cavity 234 is an outlet chamber 236. The outlet chamber 236 continues into a rectangularly cross sectioned outlet 238. The outlet 238 is formed by rectangular walls having flanges or tangs, not shown, which receive a mouthpiece 240 formed of an elastomeric silicon rubber or plasticized material.

Overlying the upper cavity 234 is a diaphragm 242 formed of an elastomeric bell-shaped member having a curved surface 244 which slopes downwardly to an expanded circular flange 246. The expanded circular flange 246 is received in the regulator body 230 by virtue of a groove 248 receiving a circular protuberance of the flange 246 therein. The diaphragm 242 is held in place by means of a retainer ring 250 which threads downwardly into threads 252 provided in the body 230.

The retainer ring 250 threads against a washer 254 which is in turn seated against a cover 258. By threading downwardly on the retainer ring 250, the entire assembly is seated in tight juxtaposition against the diaphragm flange 246 to secure it in place.

A valve body 262 is received within the cylindrical opening or chamber 232. A cylindrical member 264 is threaded into the valve body 262. An orifice or crown 266 is formed at one end. The cylindrical member 264 is sealed with respect to gas pressure flow by means of an O-ring 267 which seats the orifice or crown 266 in a position to prevent gas passage around the orifice. An O-ring 268 seals the valve body 262 into the interior of the valve body 230.

An inlet 269 can be directly connected or connected by a tube, conduit or other means, not shown, to the regulator 20 of the invention through port 202 and swivel fitting 208.

A poppet assembly 270 comprises an elongated cylindrical member 271 having a valve seat 272. The cylindrical member 271 is operatively connected to a lever 273 which is in contact with the diaphragm 242. Movement of the lever 273 causes the cylindrical member to slide back and forth within the cylindrical opening or chamber 232. A coiled compression spring 275 is received over the cylindrical member 271 which forces or drives the valve seat 272 of the cylindrical member against the orifice 266.

In operation, inhalation through the mouthpiece 240 causes the diaphragm 242 to flex inwardly causing downward pressure on the lever 273 which causes the cylindrical member 271 to move away from the orifice or crown 266. This permits flow of breathing gas from the passage 200 through swivel connector 208 of the regulator 20 into the inlet 269 of the demand regulator 228 and into the mouthpiece 240.

Other types of demand regulators are known which can be used in place of that above described above.

The regulator 20 of the invention operates when a decreased pressure is sensed within the low pressure zone in bore 82 by a user inhaling through a second stage demand regulator, thereby creating demand for breathing gas, causing the first stage regulator to function.

The first stage regulator 77 functions by virtue of the pressure in the low pressure zone in bore 82 decreasing so that the diaphragm 152 then flexes inwardly. This attendantly allows the pin support 144 to move the pin 143. As the pin 143 is moved, it pushes at its interface with the interior body of the movable valve member 118 against the springs 114 and 116.

This causes the flat seating surface 120 of the movable valve member 118 to separate from the orifice 110. This permits the flow of gas over the orifice or crown 110 into the low pressure area or zone of bore 82. Gas flow continues until the pressure increases within the low pressure zone of bore 82 sufficiently to push against the diaphragm 152 reducing the force against the seating surface 120 until the moveable valve member 118 is reseated against the orifice 110.

The adapter 22 and main body portion 78 can be made of various materials such as brass, stainless steel or other materials which are easily formed or machined.

The invention thus described combines an in-line rotatable valve with a first stage regulator and provides a safety burst disc in the in-line rotatable valve and a burst disc in a port connected to the high pressure first stage regulator chamber.

A second stage demand regulator with a mouthpiece can be attached to the regulator assembly as can a high pressure gauge. The entire unit can be packed in a holster for convenience and for emergency readiness and access.

The design is particularly suited for a small, lightweight pony pack which is suitable for emergency use.

Various modifications of the invention are contemplated which will be obvious to those skilled in the art and can be resorted to without departing from the spirit and scope of the invention as defined by the following claims.

We claim:

1. A regulator for a self-contained breathing apparatus comprising:

a regulator body;

means for connecting said regulator body to a source of high pressure gas;

an in-line valve within said regulator body in communication with said source of high pressure gas;

a burst disc disposed within said in-line valve which is adapted to block the passage of gas from said source of pressurized gas when said gas is pressurized below a given pressure and to give way when said gas is pressurized above a given pressure when said in-line valve is closed;

a first stage regulator disposed within said regulator body for receipt of pressurized gas when said in-line valve is open; and, means for connecting a demand regulator to said regulator body for receipt of regulated breathing gas from said first stage regulator.

2. A regulator for a self-contained breathing apparatus according to claim 1 wherein:

said first stage regulator is disposed within a high pressure chamber within said regulator body; and further comprising:

a conduit within said regulator body extends from said high pressure chamber to ambient;

a burst disc is disposed within said conduit; and further comprising:

means for retaining said burst disc within said conduit to block passage of gas when said gas within said high pressure chamber is below a given pressure and to give way when said gas is pressurized above a given pressure for escape of gas to ambient.

3. A regulator for a self-contained breathing apparatus according to claim 2 wherein said in-line valve comprises:

a first bore in said regulator body which is in communication with said source of high pressure gas;

a first orifice disposed within said bore;

a first movable valve member disposed within said first bore and formed with an elongated portion adapted for overlying and seating against said first orifice;

a through passage within said first movable valve member which passes through said elongated portion;

said burst disc disposed within said through passage is adapted to block the passage of gas from said source of pressurized gas through said first orifice when said gas is pressurized below a given pressure and to give way when said gas is pressurized above a given pressure when said first movable valve member is closed by being seated against said first orifice;

at least one opening within said elongated portion of said first movable valve member forming a passage between the exterior of said elongated portion and said through passage for passage of pressurized gas through said at least one opening from the exterior to said through passage when said first movable valve member is unseated from said first orifice; and, means connected to said first movable valve member for seating and unseating said first movable valve member against said first orifice.

4. A regulator for a self-contained breathing apparatus according to claim 3 wherein said first stage regulator comprises:

a high pressure chamber within said regulator body which overlies said first movable valve member and which is in communication with said first bore;

a second bore within said regulator body which is in communication with said high pressure chamber and forms a low pressure zone;

a second orifice between said high pressure chamber and said second bore;

a second movable valve member within said high pressure chamber for sealing contact with said second orifice;

a first spring biasing means within said high pressure chamber which is adapted for biasing said second movable valve member sealingly against said second orifice;

a cavity in said regulator body overlying said second bore;

a diaphragm disposed within said cavity;

linkage means between said diaphragm and said second movable valve member for moving said movable seat means against the bias of said first spring biasing means in response to movement of said diaphragm; and, a second spring biasing means within said cavity adapted for biassing said diaphragm toward said high pressure chamber and against said enlarged surface of said upright portion of said second movable valve member.

5. A regulator for a self-contained breathing apparatus according to claim 4 further comprising:

at least one opening in communication with said second bore forming said low pressure zone for attachment of a second stage demand regulator.

6. A regulator for a self-contained breathing apparatus according to claim 1 further comprising:

a demand regulator connected to said regulator body for receipt of regulated pressure gas from said first stage regulator.

7. A regulator for a self-contained breathing apparatus comprising in combination:

a regulator body;

means for connecting said regulator body to a source of high pressure gas;

an in-line valve within said regulator body in communication with said source of high pressure gas;

a burst disc disposed within said in-line valve which is adapted to block the passage of gas from said source of pressurized gas when said gas is pressurized below a given pressure and to give way when said gas is pressurized above a given pressure when said in-line valve is closed;

a first stage regulator disposed within said regulator body for receipt of pressurized gas when said in-line valve is open; and, a demand regulator connected to said first stage regulator.

8. The combination according to claim 7 wherein said in-line valve comprises:

a first bore in said regulator body which is in communication with said source of high pressure gas;

a first orifice disposed within said bore;

a first movable valve member disposed within said first bore and formed with an elongated portion adapted for overlying and seating against said first orifice;

a through passage within said first movable valve member which passes through said elongated portion;

said burst disc disposed within said through passage is adapted to block the passage of gas from said source of pressurized gas through said first orifice when said gas is pressurized below a given pressure and to give way when said gas is pressurized above a given pressure when said first movable valve member is closed by being seated against said first orifice;

at least one opening within said elongated portion of said first movable valve member forming a passage between the exterior of said elongated portion and said through passage for passage of pressurized gas through said at least one opening from the exterior to said through passage when said first movable valve member is unseated from said first orifice; and, means connected to said first movable valve member for seating and unseating said first movable valve member against said first orifice.

9. The combination according to claim 7 wherein:

said first stage regulator is disposed within a high pressure chamber within said regulator body;

a conduit within said regulator body extends from said high pressure chamber to ambient;

a burst disc is disposed within said conduit; and further comprising;

means for retaining said burst disc within said conduit to block passage of gas when said gas within said high pressure chamber is below a given pressure and to give way when said gas is pressurized above a given pressure for escape of gas to ambient.

10. A regulator for a self-contained breathing apparatus comprising:

a regulator body;

means for connecting said regulator body to a source of high pressure gas;

a first bore in said regulator body which is in communication with said source of high pressure gas;

a first orifice disposed within said bore;

a first movable valve member disposed within said first bore and formed with an elongated portion adapted for overlying and seating against said first orifice;

a through passage within said first movable valve member which passes through said elongated portion;

a burst disc disposed within said through passage which is adapted to block the passage of gas from said source of pressurized gas through said first orifice when said gas is pressurized below a given pressure and to give way when said gas is pressurized above a given pressure when said first movable valve member is closed by being seated against said first orifice;

at least one opening within said elongated portion of said first movable valve member forming a passage between the exterior of said elongated portion and said through passage for passage of pressurized gas through said at least one opening from the exterior to said through passage when said first movable valve member is unseated from said first orifice;

means connected to said first movable valve member for seating and unseating said first movable valve member against said first orifice;

a high pressure chamber within said regulator body which overlies said first movable valve member and which is in communication with said first bore;

a second bore within said regulator body which is in communication with said high pressure chamber and forms a low pressure zone;

a second orifice between said high pressure chamber and said second bore;

a second movable valve member within said high pressure chamber for sealing contact with said second orifice;

a first spring biasing means within said high pressure chamber which is adapted for biasing said second movable valve member sealingly against said second orifice;

a cavity in said regulator body overlying said second bore;

a diaphragm disposed within said cavity;

linkage means between said diaphragm and said second movable valve member for moving said movable seat means against the bias of said first spring biasing means in response to movement of said diaphragm;

a second spring biasing means within said cavity adapted for biassing said diaphragm toward said high pressure chamber and against said enlarged surface of said upright portion of said second movable valve member;

at least one opening in communication with said second bore forming said low pressure zone for attachment of a second stage demand regulator.

11. A regulator according to claim 10 further comprising:

a conduit within said regulator body which extends from the outside of said regulator body into communication with said high pressure chamber;

a burst disc disposed within said conduit; and, means for retaining said burst disc within said conduit to block passage of gas when said gas within said high pressure chamber is below a given pressure and to give way when said gas is pressurized above a given pressure for escape of gas to the exterior of said regulator body.

12. A regulator according to claim 11 wherein:

said at least one opening within said elongated portion is located between said burst disc and said high pressure chamber.

13. A regulator according to claim 11 wherein said means for retaining said burst disc within said conduit comprises:

a plug retained within said conduit, said plug having at least one opening therein which communicates with said conduit and ambient and adapted to be blocked by said burst disc.

14. A regulator according to claim 13 wherein:

said means for seating and unseating said first movable valve member comprises:

exterior threads surrounding at least a portion of said first moveable valve member; and, screw means operatively connected to said first movable valve member for rotation whereby said first moveable valve member can be seated or unseated by rotation of said screw means.

15. A regulator according to claim 10 wherein said linkage means comprises:

an upright portion formed as a pin extending from said second movable valve member into said second bore and having an enlarged surface member for contact with said diaphragm.

16. A regulator according to claim 10 wherein said second movable valve member comprises:

a stem having an enlarged flattened head overlying said stem; and, sealing means substantially enclosing said second movable valve member for seating against said second orifice.

17. A regulator according to claim 16 wherein:

said sealing means comprises a plastic material which is molded around said second movable valve and forms a peripheral extension around said flattened head.

18. A regulator according to claim 10 wherein:

said through passage within said first movable valve member has an axis and said least one opening in said elongated portion of said first movable valve member is formed with an axis which is perpendicular to said axis of said through passage.

19. A regulator according to claim 18 wherein:

said through passages number at least two.

20. A regulator according to claim 18 wherein:

said burst disc is spaced from the end of said elongated portion.

* * * * *